(12) United States Patent
Won et al.

(10) Patent No.: US 11,450,873 B2
(45) Date of Patent: Sep. 20, 2022

(54) FUEL CELL SYSTEM FOR THERMAL MANAGEMENT AND METHOD THEREOF

(71) Applicant: HYUNDAI MOBIS CO., LTD., Seoul (KR)

(72) Inventors: Jong Bo Won, Yongin-si (KR); Sung Kyung Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/346,606

(22) Filed: Jun. 14, 2021

(65) Prior Publication Data

US 2022/0209265 A1   Jun. 30, 2022

(30) Foreign Application Priority Data

Dec. 30, 2020   (KR) .................. 10-2020-0188353

(51) Int. Cl.
| | | |
|---|---|---|
| *H01M 8/04746* | (2016.01) | |
| *H01M 8/04014* | (2016.01) | |
| *H01M 8/04007* | (2016.01) | |
| *H01M 8/0432* | (2016.01) | |
| *H01M 8/0438* | (2016.01) | |
| *H01M 8/04537* | (2016.01) | |

(52) U.S. Cl.
CPC ... *H01M 8/04768* (2013.01); *H01M 8/04014* (2013.01); *H01M 8/04067* (2013.01); *H01M 8/04358* (2013.01); *H01M 8/04417* (2013.01); *H01M 8/04619* (2013.01); *H01M 2250/20* (2013.01)

(58) Field of Classification Search
CPC ......... H01M 8/04768; H01M 8/04014; H01M 8/04067; H01M 8/04358; H01M 8/04417; H01M 8/04619
See application file for complete search history.

(56) References Cited

U.S. PATENT DOCUMENTS

| | | |
|---|---|---|
| 6,651,761 B1 | 11/2003 | Hrovat et al. |
| 2013/0323539 A1 | 12/2013 | Furusawa et al. |
| 2014/0080024 A1 | 3/2014 | Igarashi et al. |
| 2016/0141645 A1 | 5/2016 | Yamada et al. |
| 2018/0170210 A1* | 6/2018 | Jeong ...................... B60L 58/33 |
| 2019/0165398 A1* | 5/2019 | Park ......................... H02J 7/14 |

FOREIGN PATENT DOCUMENTS

DE   10 2009 004 856 A1   11/2009

OTHER PUBLICATIONS

Extended European search report dated Dec. 13, 2021, in counterpart European Patent Application No. 21182461.0 (8 pages in English).

* cited by examiner

*Primary Examiner* — Stewart A Fraser
(74) *Attorney, Agent, or Firm* — NSIP Law

(57) ABSTRACT

A fuel cell system includes a sensor device that measures a coolant temperature at an inlet of a fuel cell and an outside-air temperature, a cooling fan that cools a coolant, and a cooling fan controller connected with the sensor device and the cooling fan. The cooling fan controller determines an RPM of the cooling fan, based on the outside-air temperature and an output value of the fuel cell and corrects the RPM of the cooling fan, based on the coolant temperature at the inlet of the fuel cell.

11 Claims, 8 Drawing Sheets

US 11,450,873 B2

FUEL CELL SYSTEM FOR THERMAL MANAGEMENT AND METHOD THEREOF

CROSS-REFERENCE TO RELATED APPLICATION

This application claims the benefit of priority to Korean Patent Application No. 10-2020-0188353, filed in the Korean Intellectual Property Office on Dec. 30, 2020, the entire contents of which are incorporated herein by reference.

TECHNICAL FIELD

The present disclosure relates to a technology for thermal management in a fuel cell system.

BACKGROUND

A fuel cell system may generate electrical energy using a fuel cell stack. For example, when hydrogen is used as a fuel for a fuel cell stack, it may be an alternative to solve global environmental problems, and therefore researches and developments of fuel cell systems have been consistently conducted. A fuel cell system may include a fuel cell stack that generates electrical energy, a fuel supply device that supplies a fuel (hydrogen) to the fuel cell stack, an air supply device that supplies, to the fuel cell stack, oxygen in air that is an oxidizing agent required for an electrochemical reaction, and a thermal management system (TMS) that releases heat of reaction of the fuel cell stack outside the system, controls an operating temperature of the fuel cell stack, and performs a water management function.

The thermal management system may be a kind of cooling device that circulates antifreeze, which serves as a coolant, through the fuel cell stack to maintain the fuel cell stack at an appropriate temperature (e.g., 60 C to 70 C). The thermal management system may include a TMS line through which a coolant circulates, a reservoir in which the coolant is stored, a pump that circulates the coolant, an ion filter that removes ions contained in the coolant, and a radiator that radiates heat of the coolant to the outside. In addition, the thermal management system may include a heater that heats the coolant and an HAVC unit (e.g., a heater for heating) that cools and heats the inside of a device (e.g., a vehicle) including the fuel cell system by using the coolant. The thermal management system may maintain appropriate temperatures of power electronic parts of a vehicle as well as the fuel cell stack.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a fuel cell system includes: a sensor device configured to measure a coolant temperature at an inlet of a fuel cell and to measure an outside-air temperature; a cooling fan configured to cool a coolant; and a cooling fan controller connected with the sensor device and the cooling fan. The cooling fan controller is configured to determine a revolutions per minute (RPM) of the cooling fan, based on the outside-air temperature and an output value of the fuel cell, and correct the RPM of the cooling fan, based on the coolant temperature at the inlet of the fuel cell.

The sensor device may include a coolant temperature sensor configured to measure the coolant temperature at the inlet of the fuel cell, and an outside-air temperature sensor configured to measure the outside-air temperature.

The cooling fan controller may be configured to: calculate a heating value of the fuel cell, based on the output value of the fuel cell; calculate a coolant temperature at an outlet of the fuel cell, based on the heating value of the fuel cell and the coolant temperature at the inlet of the fuel cell; calculate an air flow rate or a wind speed for a target coolant temperature at the inlet of the fuel cell, based on the coolant temperature at the outlet of the fuel cell and the outside-air temperature; and determine the RPM of the cooling fan, based on the air flow rate or the wind speed.

The cooling fan controller may be configured to: determine whether the output value of the fuel cell is in a low-output section; determine whether the coolant temperature at the inlet of the fuel cell is higher than or equal to a first threshold value, in a case in which the output value of the fuel cell is in the low-output section; correct the RPM of the cooling fan, when the coolant temperature at the inlet of the fuel cell is higher than or equal to the first threshold value; and perform control to turn off the cooling fan, in a case in which the coolant temperature at the inlet of the fuel cell is lower than the first threshold value.

The cooling fan controller may be configured to determine that the output value of the fuel cell is in the low-output section, in a case in which the output value of the fuel cell is less than a second threshold value or it is determined that the RPM of the cooling fan is 0.

The cooling fan controller may be configured to correct the RPM of the cooling fan from 0 to a minimum RPM, in a case in which the coolant temperature at the inlet of the fuel cell is higher than or equal to the first threshold value.

The fuel cell system may include: a first cooling line configured to circulate a first coolant, the first cooling line being configured to pass through the fuel cell; a first radiator disposed on the first cooling line and configured to cool the first coolant; a second cooling line configured to circulate a second coolant, the second cooling line being configured to pass through a power electronic part; and a second radiator disposed on the second cooling line and configured to cool the second coolant. The cooling fan may be configured to cool the first radiator or may be configured to simultaneously cool the first radiator and the second radiator.

In another general aspect, a method for operating a fuel cell system includes: measuring a coolant temperature at an inlet of a fuel cell; measuring an outside-air temperature; determining a revolutions per minute (RPM) of the cooling fan, based on the outside-air temperature and an output value of the fuel cell; and correcting the RPM of the cooling fan, based on the coolant temperature at the inlet of the fuel cell.

Determining the RPM of the cooling fan may include: calculating a heating value of the fuel cell, based on the output value of the fuel cell; calculating a coolant temperature at an outlet of the fuel cell, based on the heating value of the fuel cell and the coolant temperature at the inlet of the fuel cell; calculating an air flow rate or a wind speed for a target coolant temperature at the inlet of the fuel cell, based on the coolant temperature at the outlet of the fuel cell and the outside-air temperature; and determining the RPM of the cooling fan, based on the air flow rate or the wind speed.

The method may include: determining whether the output value of the fuel cell is in a low-output section; determining whether the coolant temperature at the inlet of the fuel cell is higher than or equal to a first threshold value; and correcting the RPM of the cooling fan from 0 to a minimum RPM in a case in which the coolant temperature at the inlet of the fuel cell is higher than or equal to the first threshold value, or performing control to turn off the cooling fan, in a case in which the coolant temperature at the inlet of the fuel cell is lower than the first threshold value.

Other features and aspects will be apparent from the following detailed description, the drawings, and the claims.

BRIEF DESCRIPTION OF THE DRAWINGS

The above and other objects, features and advantages of the present disclosure will be more apparent from the following detailed description taken in conjunction with the accompanying drawings.

With regard to description of the drawings, identical or similar reference numerals may be used to refer to identical or similar components.

DETAILED DESCRIPTION

Figure 1:
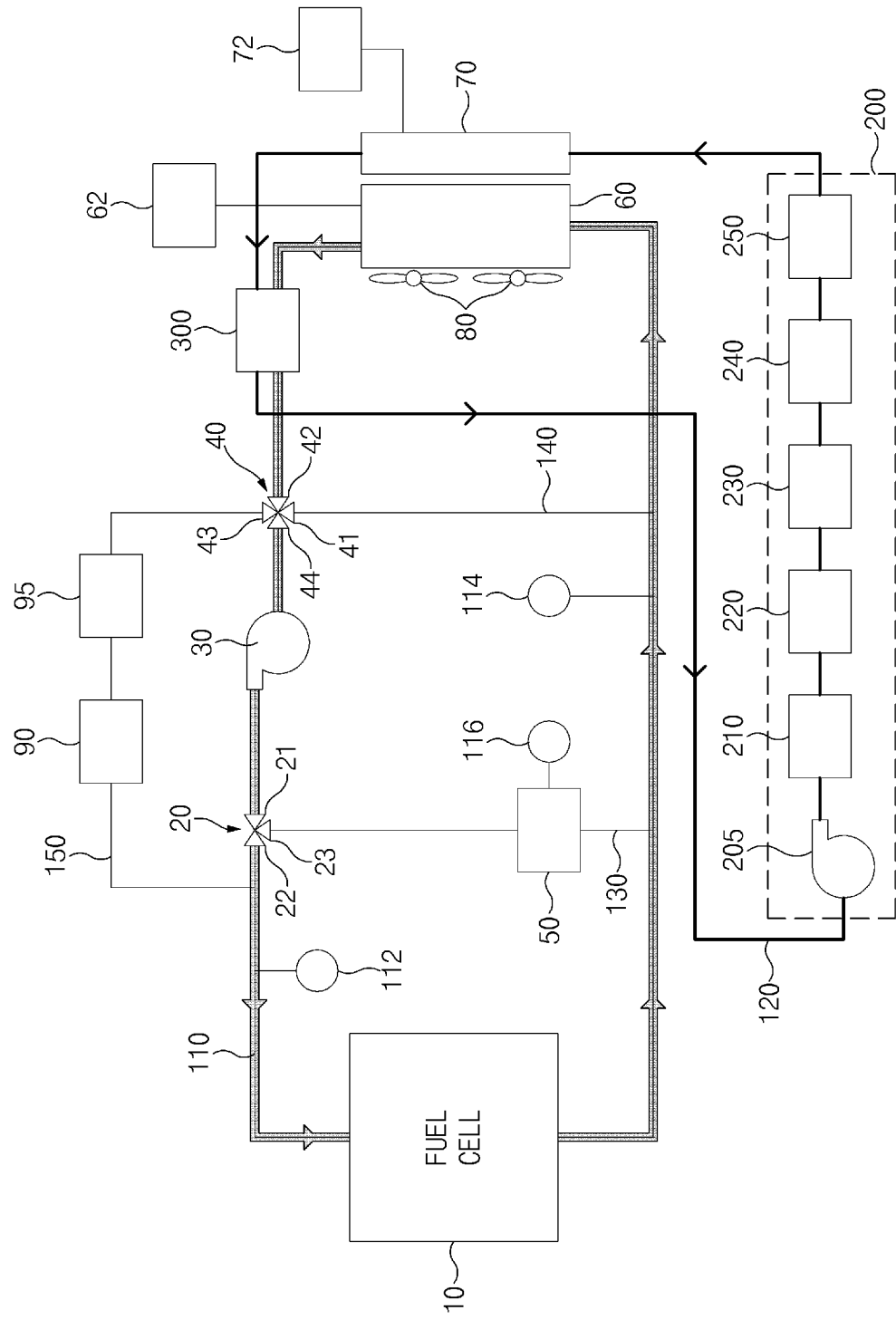
FIG. 1 illustrates a fuel cell system according to various embodiments.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine. For example, the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
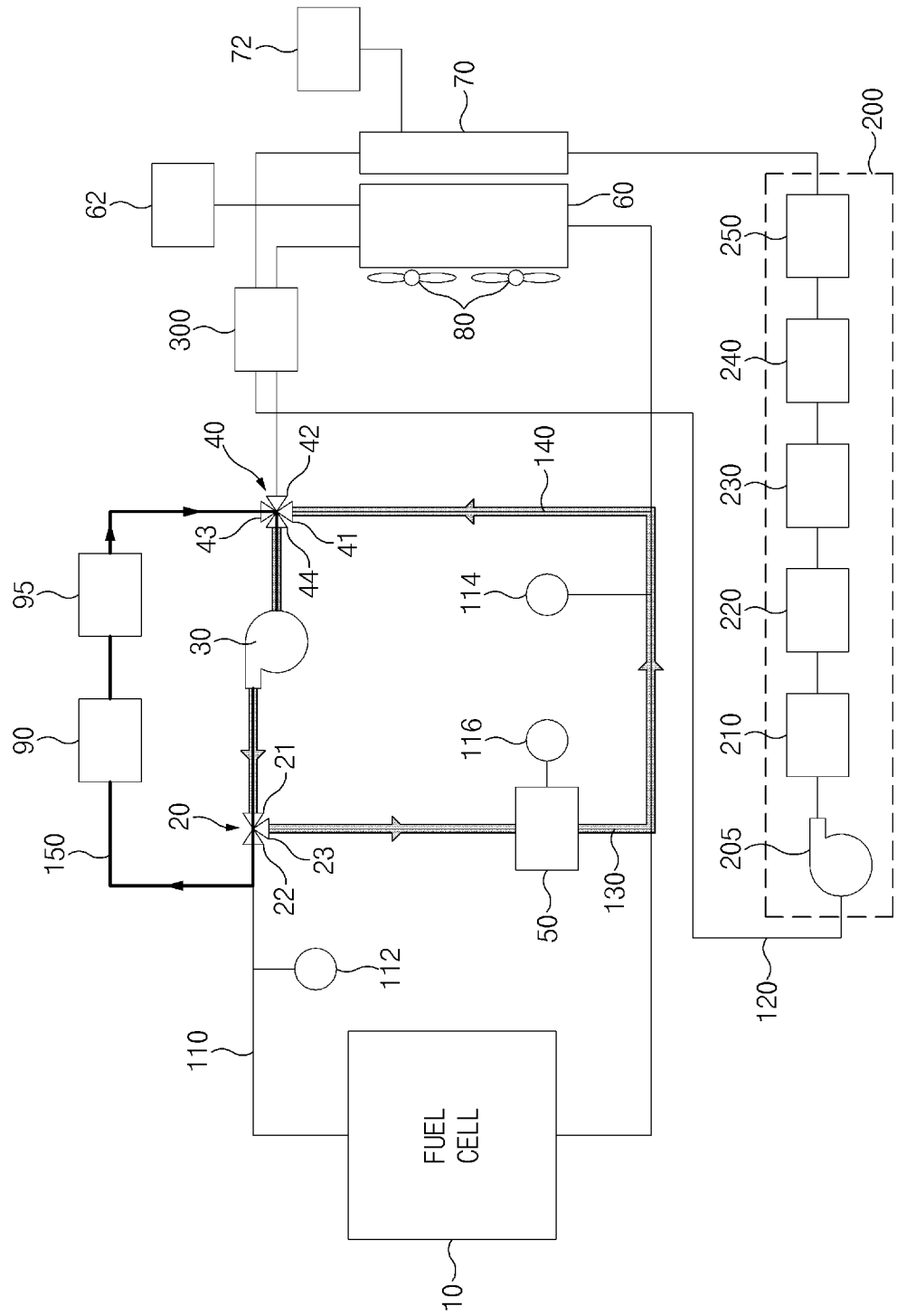
FIG. 2 illustrates the fuel cell system according to various embodiments.

FIGS. 1 and 2 illustrate a fuel cell system according to various embodiments.

Referring to FIG. 1, the fuel cell system for a vehicle may include a first cooling line 110 that passes through a fuel cell stack 10 of the vehicle and through which a first coolant circulates, a second cooling line 120 that passes through power electronic parts 200 of the vehicle and through which a second coolant circulates, and a heat exchanger 300 that allows the first coolant and the second coolant to exchange heat with each other. The first cooling line 110 and the second cooling line 120 may constitute a thermal management system (TMS) line through which the first coolant and the second coolant flow while exchanging heat with each other. In this case, the first coolant or the second coolant may be used as a cooling medium or a heating medium in the TMS line.

The fuel cell system may include a first connecting line 130 that forms a heating loop (a heat circulation path) with the first cooling line 110, a second connecting line 150 that forms a cooling/heating loop with the first cooling line 110, and a third connecting line 140 that forms a cooling loop with the first cooling line 110 to cool the first coolant. For example, as illustrated in FIG. 2, the first coolant may be cooled or heated while circulating through the first connecting line 130, the second connecting line 150, or the third connecting line 140.

The first cooling line 110 may be configured to form a cooling loop for cooling the first coolant or a heating loop for heating the first coolant (raising the temperature of the first coolant) depending on a state of the vehicle. For example, the first cooling line 110 may form a heating loop to secure cold start ability when the vehicle is initially started and may form a cooling loop to radiate heat generated from the fuel cell stack 10 to the outside during travel of the vehicle. The fuel cell stack 10, a first valve 20, a first pump 30, a second valve 40, and a first radiator 60 may be disposed on the first cooling line 110 through which the first coolant circulates.

The fuel cell stack 10 (or, referred to as the "fuel cell") may be formed in a structure capable of producing electricity through an oxidation-reduction reaction of a fuel (e.g., hydrogen) and an oxidizing agent (e.g., air). For example, the fuel cell stack 10 may include a membrane electrode assembly (MEA) in which catalyst electrode layers where an electro-chemical reaction occurs are attached to both sides of an electrolyte membrane through which hydrogen ions move, a gas diffusion layer (GDL) that uniformly distributes reactant gases and delivers generated electrical energy, a gasket and a fastening mechanism for maintaining airtightness of the reactant gases and the first coolant and appropriate fastening pressure, and a bipolar plate that moves the reactant gases and the first coolant.

In the fuel cell stack 10, hydrogen that is a fuel and air (oxygen) that is an oxidizing agent may be supplied to an anode and a cathode of the membrane electrode assembly through fluid channels of the bipolar plate, respectively. The hydrogen may be supplied to the anode, and the air may be supplied to the cathode. The hydrogen supplied to the anode may be decomposed into a hydrogen ion (proton) and an electron by catalysts of the electrode layers formed on the both sides of the electrolyte membrane. Only the hydrogen ion may be selectively delivered to the cathode through the electrolyte membrane that is a cation exchange membrane, and the electron may be delivered to the cathode through the gas diffusion layer and the bipolar plate that are conductors. At the cathode, the hydrogen ion supplied through the electrolyte membrane and the electron delivered through the bipolar plate may react with oxygen in the air supplied to the cathode by an air supply device to produce water. Due to the movement of the hydrogen ion, an electron flow through an external conductor may be generated, and electric current may be produced by the electron flow.

The first valve 20 may switch a flow path of the first coolant in the first cooling line 110 to the first connecting line 130 on which a heater 50 is disposed or the fuel cell stack 10. For example, on the first cooling line 110, the first valve 20 may be connected with one end of the first pump 30, one end of the first connecting line 130, and one end of the fuel cell stack 10. The first valve 20 may include various valve means capable of selectively switching the flow path of the first coolant. For example, the first valve 20 may be a three-way valve. In this case, the first valve 20 may include a first port 21 connected with the first cooling line 110 to allow the first coolant pumped by the first pump 30 to flow into the first valve 20, a second port 22 connected with the first cooling line 110 to allow the first coolant passing through the first valve 20 to flow into the fuel cell stack 10, and a third port 23 connected with the one end of the first connecting line 130. As the second port 22 or the third port 23 of the first valve 20 is opened or closed, the flow path of the first coolant may be switched to the heater 50 of the first connecting line 130 or the fuel cell stack 10. That is, when the second port 22 is opened and the third port 23 is closed, the first coolant may flow into the fuel cell stack 10. In contrast, when the third port 23 is opened and the second port 22 is closed, the first coolant may flow into the heater 50 through the first connecting line 130.

To heat the first coolant, the first connecting line 30 may form a heating loop (a heat circulation path) with the first cooling line 110. For example, the first coolant flowing along the first connecting line 130 may be heated while passing through the heater 50 installed on the first connecting line 130. The one end of the first connecting line 130 may be connected to the first cooling line 110 at a first point located between an outlet of the first pump 30 and the fuel cell stack 10, and an opposite end of the first connecting line 130 may be connected to the first connecting line 110 at a second point located between an inlet of the first pump 30 and the fuel cell stack 10. Here, the inlet of the first pump 30 may be defined as an inlet through which the first coolant flows into the first pump 30. The outlet of the first pump 30 may be defined as an outlet through which the first coolant passing through the first pump 30 is released. The section between the outlet of the first pump 30 and the fuel cell stack 10 may be defined as a section through which the first coolant released from the first pump 30 flows to a coolant inlet (not illustrated) of the fuel cell stack 10. The section between the inlet of the first pump 30 and the fuel cell stack 10 may be defined as a section through which the first coolant released from a coolant outlet (not illustrated) of the fuel cell stack 10 flows to the inlet of the first pump 30.

The first pump 30 may be configured to force the first coolant to flow. The first pump 30 may include various means capable of pumping the first coolant, and no special limitation applies to the type of the first pump 30 and the number of first pumps 30 in this disclosure.

The second valve 40 may switch the flow path of the first coolant in the first cooling line 110 to the first radiator 60 or the fuel cell stack 10. For example, the second valve 40 may be provided on the first cooling line 110 so as to be located between the first pump 30 and the first radiator 60 and may be connected to one end of the third connecting line 140 and one end of the second connecting line 150. The second valve 40 may include various valve means capable of selectively switching the flow path of the first coolant to the first radiator 60 or the fuel cell stack 10. For example, the second valve 40 may be a four-way valve. In this case, the second valve 40 may include a first port 41 connected with the third connecting line 140, a second port 42 connected with the first cooling line 110 to allow the first coolant passing through the first radiator 60 to flow into the second valve 40, a third port 43 connected with the one end of the second connecting line 150, and a fourth port 44 connected with the first cooling line 110 to allow the first coolant to flow into the first pump 30. As the first port 41 and the second port 42 of the second valve 40 are opened or closed, the flow path of the first coolant may be switched to the first radiator 60 or the fuel cell stack 10. That is, when the first port 41 is opened and the second port 42 is closed, the first coolant may flow into the fuel cell stack 10 without passing through the first radiator 60. In contrast, when the second port 42 is opened and the first port 41 is closed, the first coolant may flow into the fuel cell stack 10 after passing through the first radiator 60.

The second connecting line 150 may form a cooling/heating loop with the first cooling line 110 to cool/heat a HAVC unit 90. For example, the second connecting line 150 may form a loop for heating a heater (not illustrated) of the HAVC unit 90. The one end of the second connecting line 150 may be connected to the first cooling line 110 between the first point (the point at which the one end of the first connecting line 130 is connected to the first cooling line 110) and the inlet of the fuel cell stack 10, and part of the first coolant may circulate through the second connecting line 150. An opposite end of the second connecting line 150 may be connected to the first cooling line 110 between the first pump 30 and the second point (the point at which the opposite end of the first connecting line 130 is connected to the first cooling line 110).

An ion filter 95 that filters ions of the first coolant passing through the HAVC unit 90 may be disposed on the second connecting line 150. When the electric conductivity of the first coolant is increased due to corrosion or exudation of the system, electricity may flow into the first coolant, and therefore the fuel cell stack 10 may short-circuit or electric current may flow toward the first coolant. Accordingly, the first coolant has to be able to maintain a low electric conductivity. To maintain the electric conductivity of the first coolant below a predetermined level, the ion filter 95 may be configured to remove ions contained in the first coolant. During a cold-start operation in which the supply of the first coolant to the fuel cell stack 10 is stopped (or, the second port 22 of the first valve 20 is closed), the first coolant may circulate while passing through the heater 50 of the first connecting line 130 (a heating loop) and may circulate along the second connecting line 150. Accordingly, even during the cold-start operation, filtering (removal of ions contained in the first coolant) is able to be performed by the ion filter 95 disposed on the second connecting line 150. As a result, the electric conductivity of the first coolant flowing into the fuel cell stack 10 immediately after the cold-start operation may be maintained below the predetermined level.

To cool the first coolant, the third connecting line 140 may form a cooling loop with the first cooling line 110. For example, the one end of the third connecting line 140 may be connected to the first cooling line 110 between the first pump 30 and the first radiator 160, and an opposite end of the third connecting line 140 may be connected to the first cooling line 110 between the coolant outlet of the fuel cell stack 10 and the first radiator 60.

The first radiator 60 may be configured to cool the first coolant. The first radiator 60 may be formed in various structures capable of cooling the first coolant, and the present disclosure is not limited by the type and structure of the first radiator 60. The first radiator 60 may be connected to a first reservoir 62 in which the first coolant is stored.

The fuel cell system may include a first temperature sensor 112 that measures the temperature of the first coolant between the fuel cell stack 10 and the first point (the first valve 20), a second temperature sensor 114 that measures the temperature of the first coolant between the opposite end of the first connecting line 130 and the first pump 30, and a third temperature sensor 116 that measures the temperature of the first coolant in the heater 50. The fuel cell system may control the inflow rate of the first coolant flowing into the fuel cell stack 10, based on the temperatures measured by the first temperature sensor 112, the second temperature sensor 114, and the third temperature sensor 116. For example, when the measured temperature of the first coolant circulating along the first cooling line 110 is lower than a preset target temperature, the inflow rate of the first coolant may be controlled to be lower than a preset flow rate. By controlling the inflow rate of the first coolant flowing into the fuel cell stack 10 to be lower than the preset flow rate when the measured temperature of the first coolant is lower than the preset target temperature, thermal shock and performance degradation caused by a difference between the temperature of the first coolant stagnating in the fuel cell stack 10 and the temperature of the first coolant flowing into the fuel cell stack 10 may be minimized.

The second cooling line 120 may be configured to pass through the power electronic parts 200 of the vehicle, and the second coolant may circulate along the second cooling line 120. Here, the power electronic parts 200 of the vehicle may be understood as parts that use electric power of the vehicle as an energy source, and the present disclosure is not limited by the types and number of power electronic parts 200 of the vehicle. For example, the power electronic parts 200 may include at least one of a second pump 205 for pumping the second coolant, a bi-directional high voltage DC-DC converter (BHDC) 210 provided between the fuel cell stack 10 and a high-voltage battery (not illustrated) of the vehicle, a blower pump control unit (BPCU) 220 that controls a blower (not illustrated) that supplies outside air for driving the fuel cell stack 10, a low-voltage DC-DC converter (LDC) 230 that converts DC high-voltage supplied from the high-voltage battery into DC low-voltage, an air compressor (ACP) 240 that compresses air to be supplied into the fuel cell stack 10, or an air cooler 250.

A second pump (not illustrated) for forcing the second coolant to flow may be disposed on the second cooling line 120. The second pump may include a pumping means capable of pumping the second coolant, and no special limitation applies to the type and characteristics of the second pump.

A second radiator 70 for cooling the second coolant may be disposed on the second cooling line 120. The second radiator 70 may be formed in various structures capable of cooling the second coolant, and no special limitation applies to the type and structure of the second radiator 70. The second radiator 70 may be connected to a second reservoir 72 in which the second coolant is stored.

In an embodiment, the first radiator 60 and the second radiator 70 may be configured to be simultaneously cooled by one cooling fan 80. For example, the first radiator 60 and the second radiator 70 may be disposed side by side, and the cooling fan 80 may be configured to blow outside air toward the first radiator 60 and the second radiator 70. By simultaneously cooling the first radiator 60 and the second radiator 70 with the one cooling fan 80, the structure of the fuel cell system may be simplified, a degree of freedom in design and space utilization may be improved, and power consumption for cooling the first radiator 60 and the second radiator 70 may be minimized.

The heat exchanger 300 may be configured to allow the first coolant and the second coolant to exchange heat with each other. The temperature of the second coolant for cooling the power electronic parts 200 is set to be lower than the temperature of the first coolant for cooling the fuel cell stack 10. Accordingly, by allowing the first coolant and the second coolant to exchange heat with each other, the fuel cell system may achieve a decrease in the temperature of the first coolant, an improvement in the cooling efficiency of the fuel cell stack 10, and an improvement in safety and reliability even without increasing the capacities of the first radiator 60 and the cooling fan 80. Furthermore, the fuel cell system may lower the temperature of the first coolant in a stop state of a vehicle (e.g., a construction machine) that cannot use vehicle-induced wind. Accordingly, the fuel cell system may ensure high-power operation of the fuel cell stack 10 and may improve safety and durability.

In an embodiment, the heat exchanger 300 may be connected to the first cooling line 110 between the outlet of the first radiator 60 and the fuel cell stack 10, and the second cooling line 120 may pass through the heat exchanger 300 and may connect an outlet of the second radiator 70 and the power electronic parts 200. For example, the first coolant may flow along the heat exchanger 300 connected to the first cooling line 110, and the second cooling line 120 may pass through the inside of the heat exchanger 300 so as to be exposed to the first coolant (e.g., so as to allow the first coolant to flow around the second cooling line 120). As described above, the temperature of the first coolant flowing into the fuel cell stack 10 may be lowered by the heat exchange between the first coolant and the second coolant. A first temperature of the first coolant passing through the first radiator 60 may be higher than a second temperature of the second coolant passing through the second radiator 70, and a third temperature of the first coolant passing through the heat exchanger 300 may be lower than the first temperature. For example, the first temperature of the first coolant may be higher than the second temperature of the second coolant by about 10° C., and the third temperature of the first coolant that passes through the heat exchanger 300 (or, exchanges heat with the second coolant) may be lower than the first temperature by 1° C.

When the vehicle equipped with the fuel cell system travels, the first coolant flowing into the fuel cell stack 10 may be cooled by not only the cooling fan 80 but also vehicle-induced wind generated depending on vehicle speed. When the vehicle is in a stop state, vehicle-induced wind may not be generated, and therefore the first coolant may be cooled by the cooling fan 80. However, a cooling capacity by the cooling fan 80 may be insufficient in a vehicle, such as a construction machine, which performs a task such as leveling or loading even in a stop state. The fuel cell system according to the embodiments may determine the RPM of the cooling fan 80 in consideration of an output value of the fuel cell stack 10, thereby efficiently cooling the fuel cell stack 10 even in a situation in which there is no vehicle-induced wind. In addition, the fuel cell system according to the embodiments may correct the RPM of the cooling fan 80 depending on a coolant temperature even in a low-output section of the fuel cell stack 10, thereby more precisely adjusting a cooling capacity.

Figure 3:
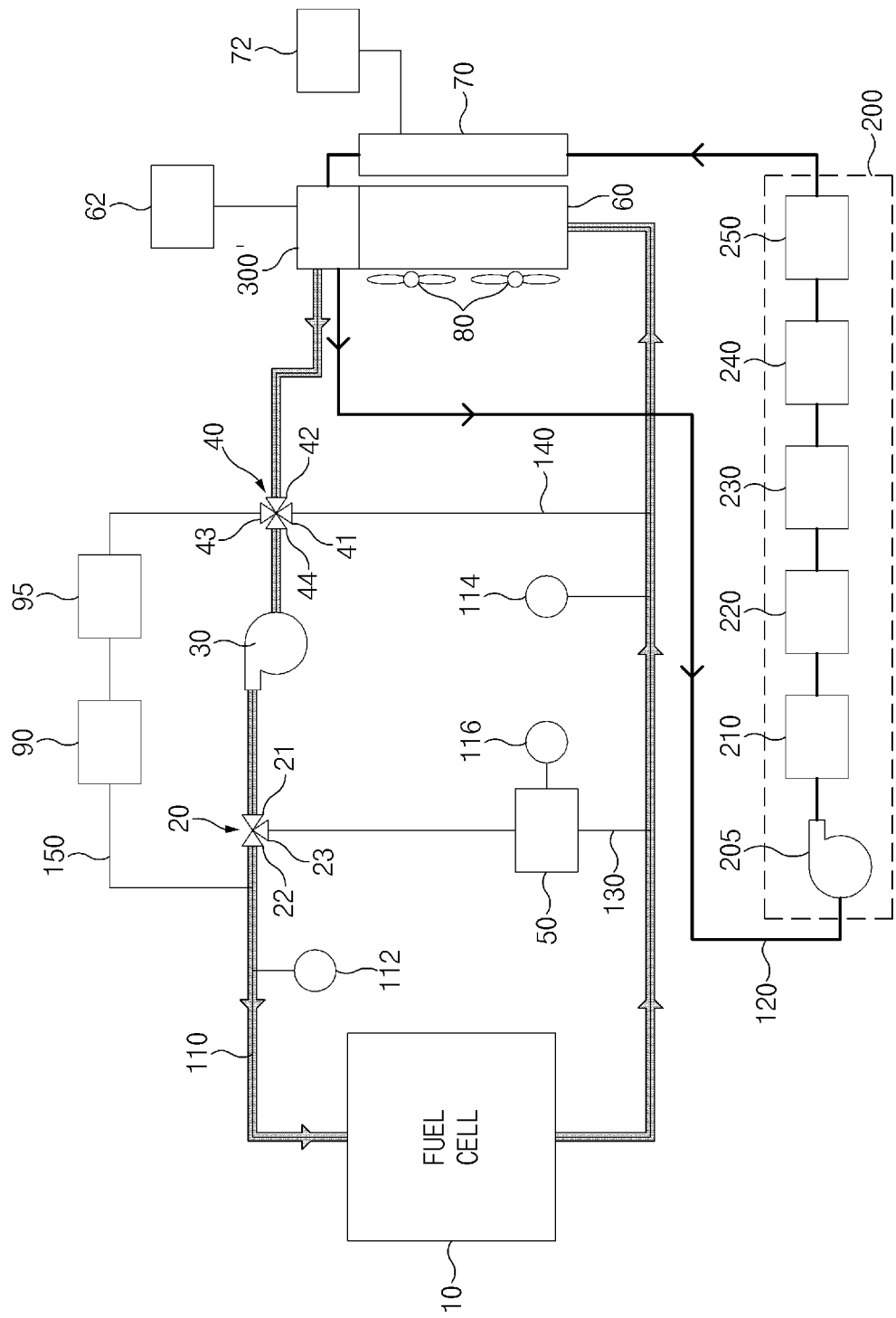
FIG. 3 illustrates another example of the fuel cell system according to various embodiments.
Figure 4:
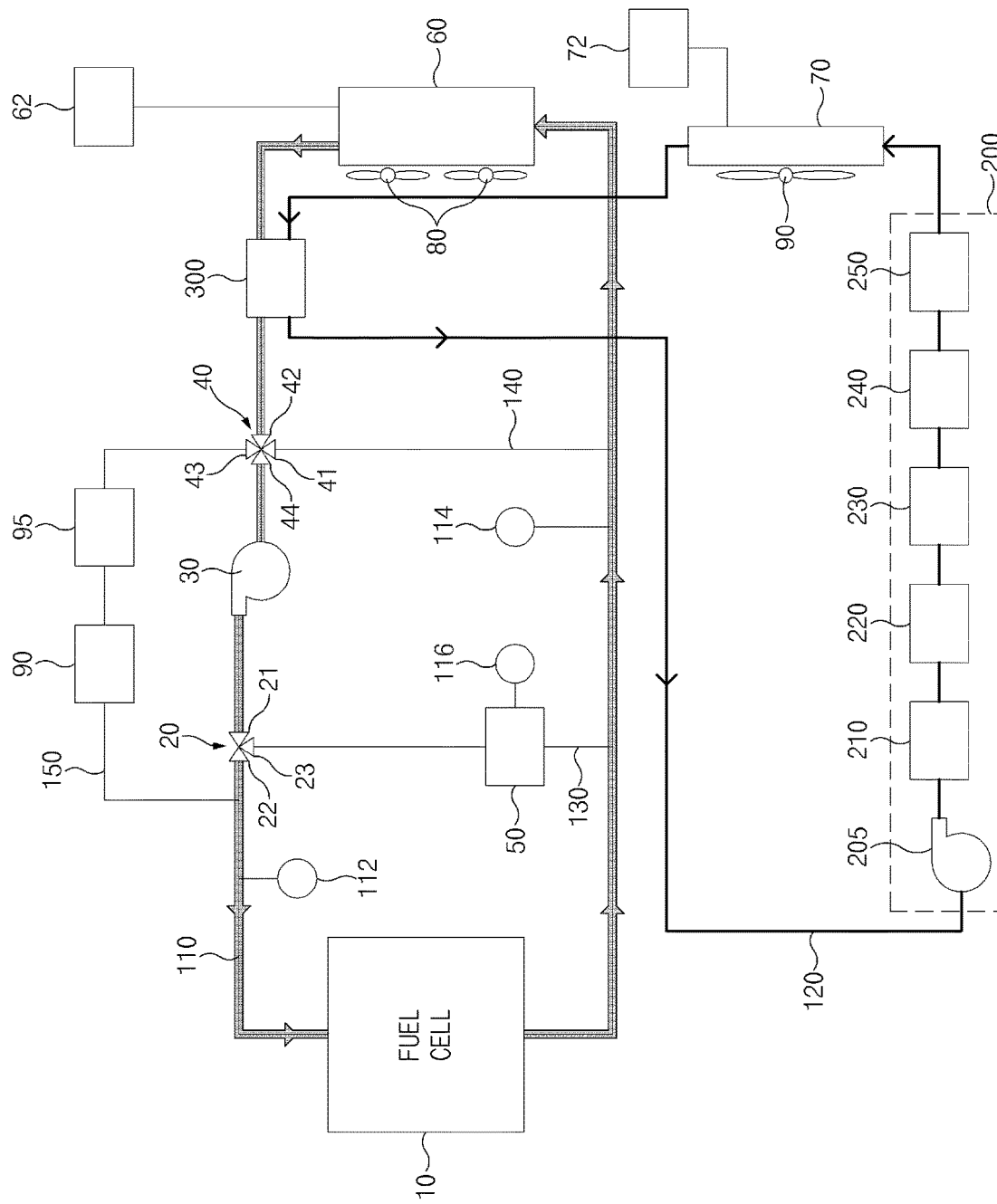
FIG. 4 illustrates another example of the fuel cell system according to various embodiments.

FIGS. 3 and 4 illustrate other examples of the fuel cell system according to various embodiments.

The heat exchanger 300 in FIGS. 1 and 2 is disposed separately from the first radiator 60, whereas a heat exchanger 300' in FIG. 3 may be directly connected to the first radiator 60. The heat exchanger 300' may be formed in various structures capable of being connected with the first radiator 60, and no special limitation applies to the structure and the connecting structure of the heat exchanger 300'. For example, the heat exchanger 300' may be connected to a specified location (an upper left portion) of the first radiator 60. However, the specified location of the first radiator 60 to which the heat exchanger 300' is connected may be changed.

Referring to FIG. 4, the first fan 80 for cooling the first radiator 60 and a second cooling fan 90 for cooling the second radiator 70 may be separately disposed. In this case, the fuel cell system may exclude parameters related to heat loads of the power electronic parts 200 when controlling the RPM of the first cooling fan 80.

Figure 5:
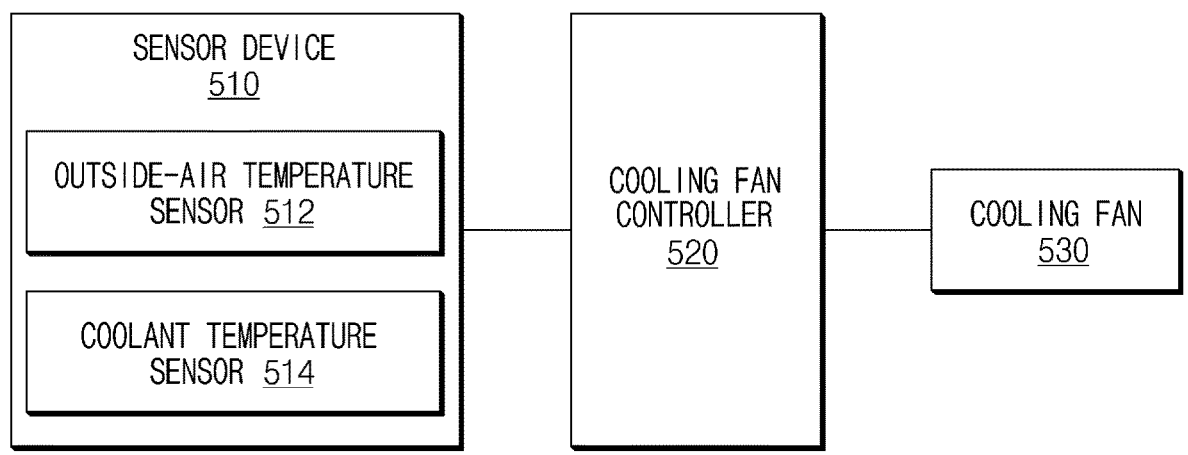
FIG. 5 is a block diagram of a fuel cell system controlling a cooling fan according to various embodiments.

FIG. 5 is a block diagram of a fuel cell system controlling a cooling fan according to various embodiments. Referring to FIG. 5, the fuel cell system may include a sensor device 510, a cooling fan controller 520, and a cooling fan 530.

The cooling fan 530 may be configured to cool the first coolant passing through the fuel cell stack 10. The cooling fan 530 may correspond to, for example, the cooling fan 80 of FIG. 1 or 4.

The sensor device 510 may include at least one sensor 512 or 514 capable of measuring temperature. For example, the outside-air temperature sensor 512 may measure the temperature of air outside the fuel cell system (or, the vehicle). The outside-air temperature sensor 512 may be disposed on a front surface of the first radiator 60 or the second radiator 70. The coolant temperature sensor 514 may measure a coolant temperature of a point corresponding to the inlet of the fuel cell stack 10 (e.g., a position corresponding to the first temperature sensor 112 of FIG. 1). According to an embodiment, the outside-air temperature sensor 512 and the coolant temperature sensor 514 may be implemented with one integrated module, or may be implemented with separate components.

The cooling fan controller 520 may be a hardware or software module for controlling the cooling fan 530 in the fuel cell system. The cooling fan controller 520 may be electrically connected with the sensor device 510 and the cooling fan 530 and may perform an overall operation of the fuel cell system that controls the RPM of the cooling fan 530. For example, the cooling fan controller 520 may determine the RPM of the cooling fan 530 in consideration of an outside-air temperature measured by the sensor device 510 and an output value of the fuel cell stack 10. The output value of the fuel cell stack 10 (or, the output value of the fuel cell) may be determined by a controller (e.g., a fuel-cell control unit (FCU)) of the fuel cell stack 10. The cooling fan controller 520 may correct the determined RPM of the cooling fan 530, based on a coolant temperature at the inlet of the fuel cell stack 10 that is measured by the sensor device 510. Specifically, the cooling fan controller 520 may correct the RPM of the cooling fan 530 in a low-output section in which the output value of the fuel cell is less than a threshold value, thereby ensuring cooling performance in a situation in which heat loads of the fuel cell stack 10 or the power electronic parts 200 may occur, with the vehicle in a stop state.

Figure 6:
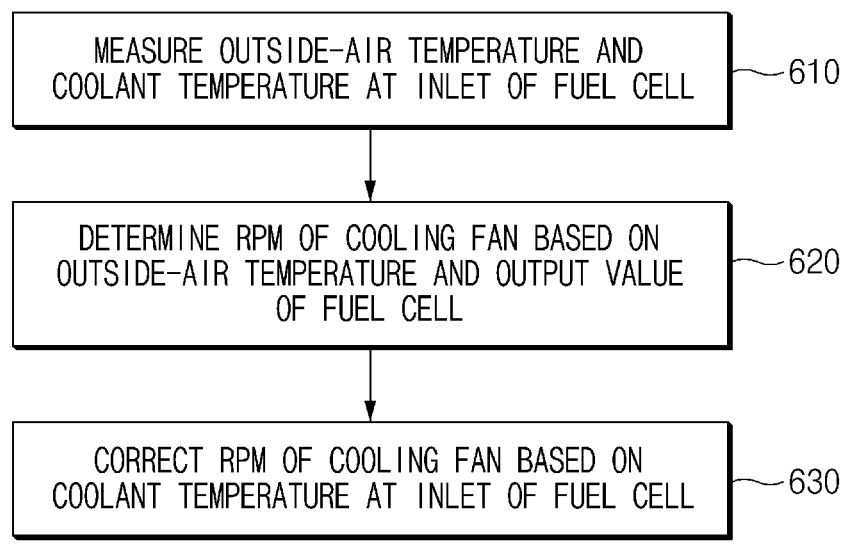
FIG. 6 is an operation flowchart for controlling the cooling fan according to various embodiments.

FIG. 6 is an operation flowchart for controlling the cooling fan according to various embodiments. Operations included in operation flowcharts of FIGS. 6 to 8 may be implemented by the fuel cell system, or may be implemented by a component (e.g., the cooling fan controller 520) included in the fuel cell system.

Referring to FIG. 6, in operation 610, the fuel cell system may measure an outside-air temperature and a coolant temperature at the inlet of the fuel cell through the sensor device 510. The fuel cell system may measure the outside-air temperature and the coolant temperature every specified period or every time a specified event (e.g., start, travel, stop, or work of the vehicle) occurs.

In operation 620, the fuel cell system may determine an RPM of the cooling fan 530 through the cooling fan controller 520. The cooling fan controller 520 may determine the RPM of the cooling fan 530, based on the outside-air temperature and an output value of the fuel cell (or, the fuel cell stack 10).

In operation 630, the fuel cell system may correct the RPM of the cooling fan 530 through the cooling fan controller 520. The cooling fan controller 520 may correct the RPM of the cooling fan 530, based on the coolant temperature at the inlet of the fuel cell.

Figure 7:
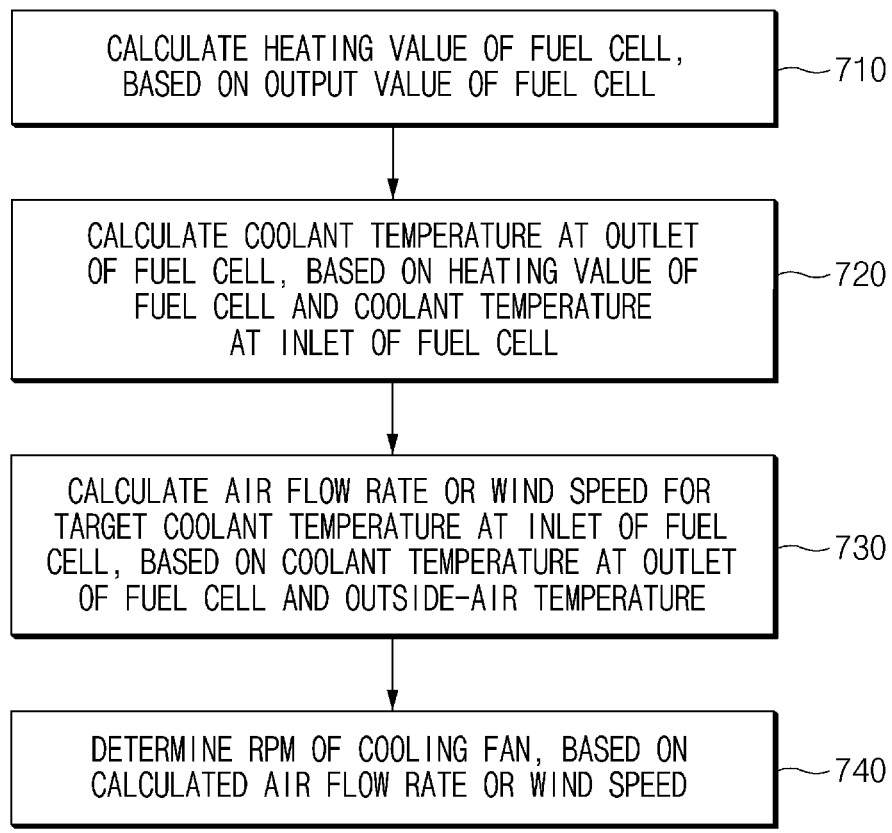
FIG. 7 is an operation flowchart for determining the RPM of the cooling fan according to various embodiments.

FIG. 7 is an operation flowchart for determining the RPM of the cooling fan according to various embodiments. For example, operations of FIG. 7 may be expressed as an example of operation 620 of FIG. 6.

Referring to FIG. 7, in operation 710, the fuel cell system may calculate a heating value of the fuel cell, based on the output value of the fuel cell. The heating value may correspond to internal loss of the fuel cell, and the cooling fan controller 520 may calculate the heating value to be a difference between the output value/the output efficiency and the output value.

In operation 720, the fuel cell system may calculate a coolant temperature at the outlet of the fuel cell, based on the heating value of the fuel cell and the coolant temperature at the inlet of the fuel cell. In this case, the cooling fan controller 520 may calculate the coolant temperature at the outlet of the fuel cell by applying a target coolant temperature at the inlet of the fuel cell, which is required to maintain an appropriate temperature of the fuel cell, without using the coolant temperature at the inlet of the fuel cell that is measured by the sensor device 510. The coolant temperature at the outlet of the fuel cell may correspond to a coolant temperature at an inlet of a radiator (e.g., the first radiator 60 of FIG. 1). According to an embodiment, the cooling fan controller 520 may calculate the coolant temperature at the outlet of the fuel cell, further based on the RPM of a pump (e.g., the first pump 30 of FIG. 1) that pumps a coolant.

In operation 730, the fuel cell system may calculate an air flow rate or a wind speed of the cooling fan 530 for the target coolant temperature at the inlet of the fuel cell, based on the coolant temperature at the outlet of the fuel cell and the outside-air temperature.

In operation 740, the fuel cell system may determine the RPM of the cooling fan 530, based on the calculated air flow rate or wind speed. According to embodiments, the cooling fan controller 520 may store, in a database, table information (e.g., a look-up table) that represents a relationship between the outside-air temperature, the output value of the fuel cell, and the RPM of the cooling fan 530. For example, the table information may be represented as in Table 1 below.

TABLE 1

| Cooling Fan RPM | | Output Value of Fuel Cell (Unit: kW) | | | | |
|---|---|---|---|---|---|---|
| (Unit: RPM) | 0 | A | B | C | D | E |
| Outside-Air Temperature (Unit: °C.) <-10 | 0 | $W_{-10A}$ | $W_{-10A}$ | $W_{-10A}$ | $W_{-10A}$ | $W_{-10A}$ |
| 0 | 0 | $W_{0A}$ | $W_{0B}$ | $W_{0C}$ | $W_{0D}$ | $W_{0E}$ |
| 10 | 0 | $W_{10A}$ | $W_{10B}$ | $W_{10C}$ | $W_{10D}$ | $W_{10E}$ |
| 20 | 0 | $W_{20A}$ | $W_{20B}$ | $W_{20C}$ | $W_{20D}$ | $W_{20E}$ |
| 30 | 0 | $W_{30A}$ | $W_{30B}$ | $W_{30C}$ | $W_{30D}$ | $W_{30E}$ |
| 40 | 0 | $W_{40A}$ | $W_{40B}$ | $W_{40C}$ | $W_{40D}$ | $W_{40E}$ |
| 50 | 0 | $W_{50A}$ | $W_{50B}$ | $W_{50C}$ | $W_{50D}$ | $W_{50E}$ |

In Table 1, the output value of the fuel cell may have the relation $0<A<B<C<D<E$. Although the RPM of the cooling fan 530 increases as the output value of the fuel cell or the outside-air temperature increases, the RPM of the cooling fan 530 is not necessarily directly proportional to the output value of the fuel cell or the outside-air temperature. The performance of the cooling fan 530 may be finite, and the cooling fan controller 520 may set a cooling fan RPM of a predetermined level or more as a maximum RPM. For example, $W_{40E}$, $W_{50D}$, and $W_{50E}$ may be maximum RPMs and may all be the same. In contrast, when the cooling fan 530 rotates at an RPM below the predetermined level, there may be no influence on cooling performance, and therefore the cooling fan controller 520 may set a cooling fan RPM of the predetermined level or less as a minimum RPM.

Values representing the outside-air temperature, the output value of the fuel cell, and the RPM of the cooling fan 530 may be discrete, and therefore a value between values expressed in the table information may be processed by interpolation. For example, when the outside-air temperature is 0 and the output value of the fuel cell is between A and B, the cooling fan controller 520 may set the RPM of the cooling fan 530 to $W_{0A}$. When the output value of the fuel cell is less than A as in the case where a vehicle (e.g., a construction machine) stops, the cooling fan controller 520 may set the RPM of the cooling fan 530 to 0. In this case, cooling performance may be remarkably decreased as heat loads of the power electronic parts 200 or ventilation resistance on an air flow path increases or decreases. To ensure cooling performance, the fuel cell system according to the embodiments may correct the determined RPM, based on the coolant temperature at the inlet of the fuel cell.

Figure 8:
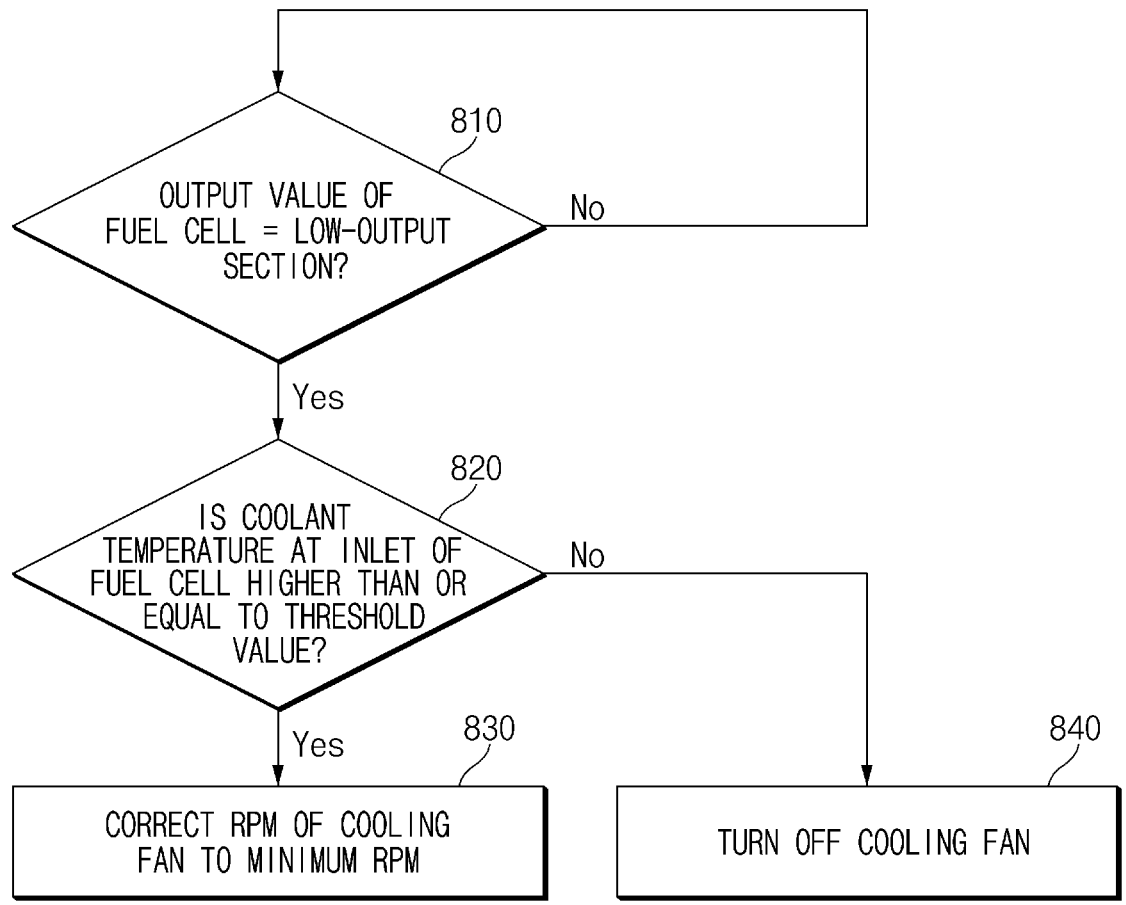
FIG. 8 is an operation flowchart for correcting the RPM of the cooling fan according to various embodiments.

FIG. 8 is an operation flowchart for correcting the RPM of the cooling fan according to various embodiments.

Referring to FIG. 8, in operation 810, the fuel cell system may determine, through the cooling fan controller 520, whether the output value of the fuel cell is in a low-output section. The low-output section may represent, for example, a case where the output value of the fuel cell is less than a specified threshold value (e.g., "A" in Table 1) or the determined RPM of the cooling fan 530 is 0. When the output value of the fuel cell is not in the low-output section, the fuel cell system may repeat operation 810.

When the output value of the fuel cell is in the low-output section, in operation 820, the fuel cell system may determine, through the cooling fan controller 520, whether the coolant temperature at the inlet of the fuel cell is higher than or equal to a threshold value.

When the coolant temperature at the inlet of the fuel cell is higher than or equal to the threshold value, the fuel cell system may, in operation 830, correct the RPM of the cooling fan 530 through the cooling fan controller 520. In this case, the cooling fan controller 520 may set the RPM of the cooling fan 530, which is set to 0, to the minimum RPM, thereby reducing unnecessary power consumption while ensuring cooling performance.

When the coolant temperature at the inlet of the fuel cell is lower than the threshold value, the fuel cell system may perform control to turn off the cooling fan 530 through the cooling fan controller 520.

According to the embodiments of the present disclosure, the fuel cell system may improve safety and durability of the fuel cell while ensuring high power of the fuel cell stack.

According to the embodiments of the present disclosure, the fuel cell system may improve cooling performance even in a stop state of a vehicle, thereby improving safety and durability of the fuel cell.

According to the embodiments of the present disclosure, the fuel cell system may prevent degradation in cooling performance due to heat loads of power electronic parts.

In addition, the present disclosure may provide various effects that are directly or indirectly recognized.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A fuel cell system comprising:
a sensor device configured to measure a coolant temperature at an inlet of a fuel cell and to measure an outside-air temperature;
a cooling fan configured to cool a coolant; and
a cooling fan controller connected with the sensor device and the cooling fan,
wherein the cooling fan controller is programmed to:
determine a revolutions per minute (RPM) of the cooling fan, based on the outside-air temperature and an output value of the fuel cell; and
correct the RPM of the cooling fan, based on the coolant temperature at the inlet of the fuel cell.

2. The fuel cell system of claim 1, wherein the sensor device comprises:
a coolant temperature sensor configured to measure the coolant temperature at the inlet of the fuel cell; and
an outside-air temperature sensor configured to measure the outside-air temperature.

3. The fuel cell system of claim 1, wherein the cooling fan controller is programmed to:
calculate a heating value of the fuel cell, based on the output value of the fuel cell;
calculate a coolant temperature at an outlet of the fuel cell, based on the heating value of the fuel cell and the coolant temperature at the inlet of the fuel cell;
calculate an air flow rate or a wind speed for a target coolant temperature at the inlet of the fuel cell, based on the coolant temperature at the outlet of the fuel cell and the outside-air temperature; and
determine the RPM of the cooling fan, based on the air flow rate or the wind speed.

4. The fuel cell system of claim 1, wherein the cooling fan controller is programmed to:
determine whether the output value of the fuel cell is in a low-output section;
determine whether the coolant temperature at the inlet of the fuel cell is higher than or equal to a first threshold value, in a case in which the output value of the fuel cell is in the low-output section;
correct the RPM of the cooling fan, when the coolant temperature at the inlet of the fuel cell is higher than or equal to the first threshold value; and
perform control to turn off the cooling fan, in a case in which the coolant temperature at the inlet of the fuel cell is lower than the first threshold value.

5. The fuel cell system of claim 4, wherein the cooling fan controller is programmed to determine that the output value of the fuel cell is in the low-output section, in a case in which the output value of the fuel cell is less than a second threshold value or it is determined that the RPM of the cooling fan is 0.

6. The fuel cell system of claim 5, wherein the cooling fan controller is programmed to correct the RPM of the cooling fan from 0 to a minimum RPM, in a case in which the coolant temperature at the inlet of the fuel cell is higher than or equal to the first threshold value.

7. The fuel cell system of claim 1, further comprising:
a first cooling line configured to circulate a first coolant, the first cooling line being configured to pass through the fuel cell;
a first radiator disposed on the first cooling line and configured to cool the first coolant;
a second cooling line configured to circulate a second coolant, the second cooling line being configured to pass through a power electronic part; and
a second radiator disposed on the second cooling line and configured to cool the second coolant,
wherein the cooling fan is configured to simultaneously cool the first radiator and the second radiator.

8. The fuel cell system of claim 1, further comprising:
a first cooling line configured to circulate a first coolant, the first cooling line being configured to pass through the fuel cell;
a first radiator disposed on the first cooling line and configured to cool the first coolant;
a second cooling line configured to circulate a second coolant, the second cooling line being configured to pass through a power electronic part; and
a second radiator disposed on the second cooling line and configured to cool the second coolant,
wherein the cooling fan is configured to cool the first radiator.

9. A method for operating a fuel cell system, the method comprising:
measuring a coolant temperature at an inlet of a fuel cell;
measuring an outside-air temperature;
determining a revolutions per minute (RPM) of the cooling fan, based on the outside-air temperature and an output value of the fuel cell; and
correcting the RPM of the cooling fan, based on the coolant temperature at the inlet of the fuel cell.

10. The method of claim 9, wherein determining the RPM of the cooling fan comprises:
calculating a heating value of the fuel cell, based on the output value of the fuel cell;
calculating a coolant temperature at an outlet of the fuel cell, based on the heating value of the fuel cell and the coolant temperature at the inlet of the fuel cell;
calculating an air flow rate or a wind speed for a target coolant temperature at the inlet of the fuel cell, based on the coolant temperature at the outlet of the fuel cell and the outside-air temperature; and
determining the RPM of the cooling fan, based on the air flow rate or the wind speed.

11. The method of claim 9, further comprising:
determining whether the output value of the fuel cell is in a low-output section;
determining whether the coolant temperature at the inlet of the fuel cell is higher than or equal to a first threshold value; and
correcting the RPM of the cooling fan from 0 to a minimum RPM in a case in which the coolant temperature at the inlet of the fuel cell is higher than or equal to the first threshold value, or performing control to turn off the cooling fan, in a case in which the coolant temperature at the inlet of the fuel cell is lower than the first threshold value.

* * * * *